(12) United States Patent
Gune et al.

(10) Patent No.: US 12,273,788 B2
(45) Date of Patent: Apr. 8, 2025

(54) PRIORITIZING SIDELINK TRANSMISSIONS FOR HIGH-SPEED STATES

(71) Applicant: QUALCOMM Incorporated, San Diego, CA (US)

(72) Inventors: Abhijeet Shrikrishna Gune, Frankfurt am Main (DE); Nisha Pushpavadan Champaneria, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 537 days.

(21) Appl. No.: 17/644,681

(22) Filed: Dec. 16, 2021

(65) Prior Publication Data
US 2023/0199431 A1    Jun. 22, 2023

(51) Int. Cl.
| | |
|---|---|
| *H04W 4/02* | (2018.01) |
| *H04W 4/40* | (2018.01) |
| *H04W 8/18* | (2009.01) |
| *H04W 36/00* | (2009.01) |
| *H04W 36/32* | (2009.01) |
| *H04W 60/00* | (2009.01) |
| *H04W 72/1263* | (2023.01) |

(52) U.S. Cl.
CPC ............. *H04W 4/027* (2013.01); *H04W 8/18* (2013.01); *H04W 36/00692* (2023.05); *H04W 36/322* (2023.05); *H04W 60/005* (2013.01); *H04W 72/1263* (2013.01); *H04W 4/40* (2018.02)

(58) Field of Classification Search
CPC ... H04W 4/027; H04W 8/18; H04W 36/0069; H04W 36/32; H04W 60/005; H04W 72/1263; H04W 4/40; H04W 92/18
See application file for complete search history.

(56) References Cited

U.S. PATENT DOCUMENTS

| | | | | |
|---|---|---|---|---|
| 2017/0366236 A1* | 12/2017 | Ryoo | ............... | H04B 7/0617 |
| 2021/0135732 A1* | 5/2021 | Sun | ............... | H04L 5/0048 |
| 2021/0176820 A1* | 6/2021 | Zhang | ............... | H04W 8/005 |
| 2022/0264523 A1* | 8/2022 | Fehrenbach | ............... | H04W 88/06 |
| 2022/0264635 A1* | 8/2022 | Agiwal | ............... | H04W 72/21 |

* cited by examiner

*Primary Examiner* — Mazda Sabouri
(74) *Attorney, Agent, or Firm* — Procopio, Cory, Hargreaves & Savitch LLP

(57) ABSTRACT

A UE may communicate with at least one wireless device based on a first subscription and a second subscription. At high speeds, the UE may be unable to reliably transmit a sidelink transmission while the second subscription is in use. The UE may maintain the second subscription in an idle mode based on a speed state of the UE. The UE may transmit a sidelink transmission while the second subscription is in the idle mode to increase a reliability of the sidelink transmission.

30 Claims, 10 Drawing Sheets

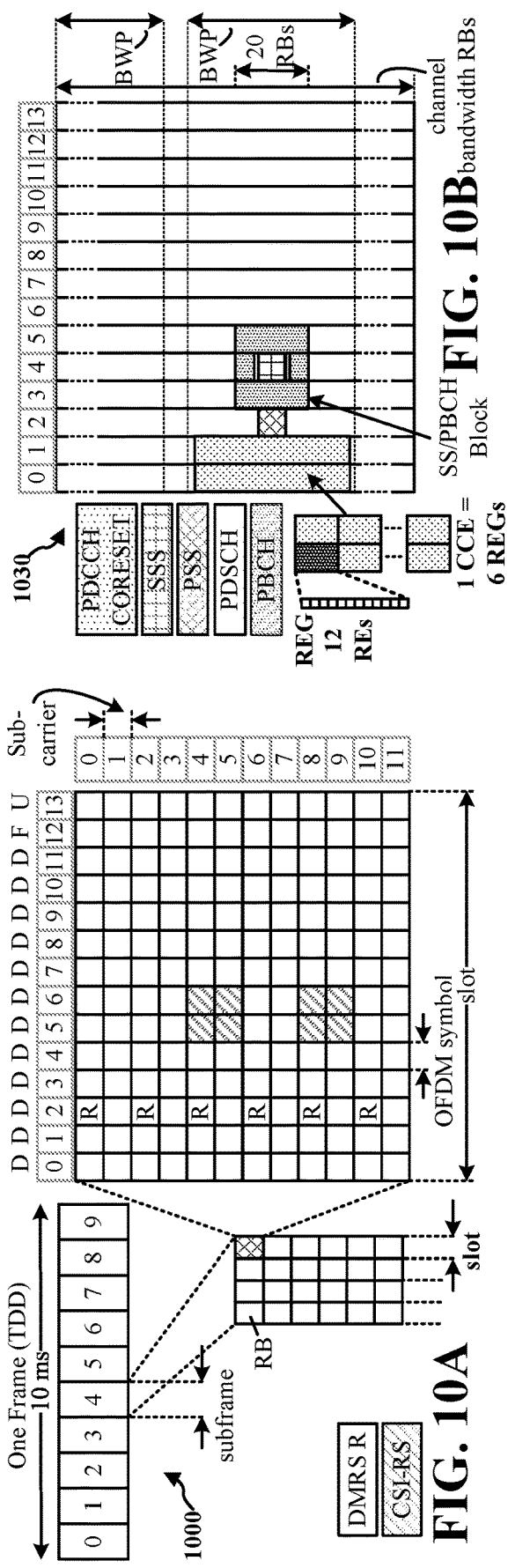
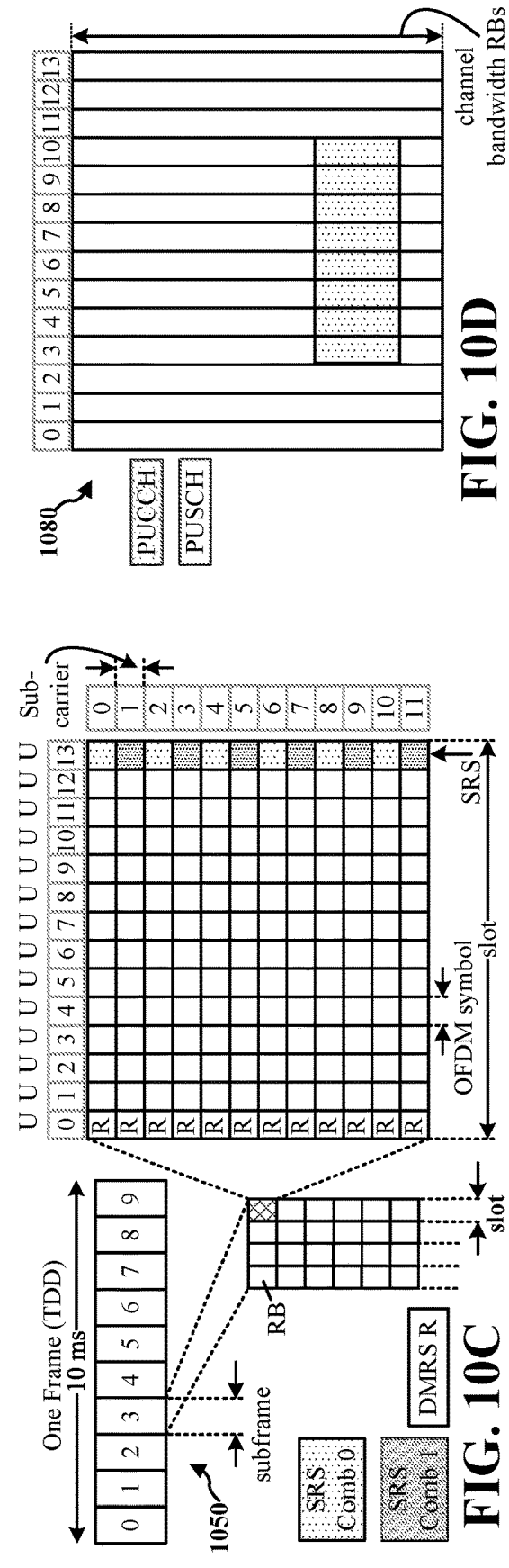
FIG. 10A
FIG. 10B
FIG. 10C
FIG. 10D

PRIORITIZING SIDELINK TRANSMISSIONS FOR HIGH-SPEED STATES

INTRODUCTION

The present disclosure relates generally to communication systems, and more particularly, to sidelink communication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may include direct communication between devices based on sidelink. There exists a need for further improvements in sidelink technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a memory and at least one processor coupled to the memory and configured to communicate with at least one wireless device based on a first subscription and a second subscription. The at least one processor may be further configured to maintain the second subscription in an idle mode based on a speed state of a user equipment (UE). The at least one processor may be further configured to transmit a sidelink transmission while the second subscription is in the idle mode.

To the accomplishment of the foregoing and related ends, the one or more aspects may include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 10A is a diagram illustrating an example of a first frame, in accordance with various aspects of the present disclosure.

FIG. 10B is a diagram illustrating an example of DL channels within a subframe, in accordance with various aspects of the present disclosure.

FIG. 10C is a diagram illustrating an example of a second frame, in accordance with various aspects of the present disclosure.

FIG. 10D is a diagram illustrating an example of UL channels within a subframe, in accordance with various aspects of the present disclosure.

DETAILED DESCRIPTION

Figure 1:
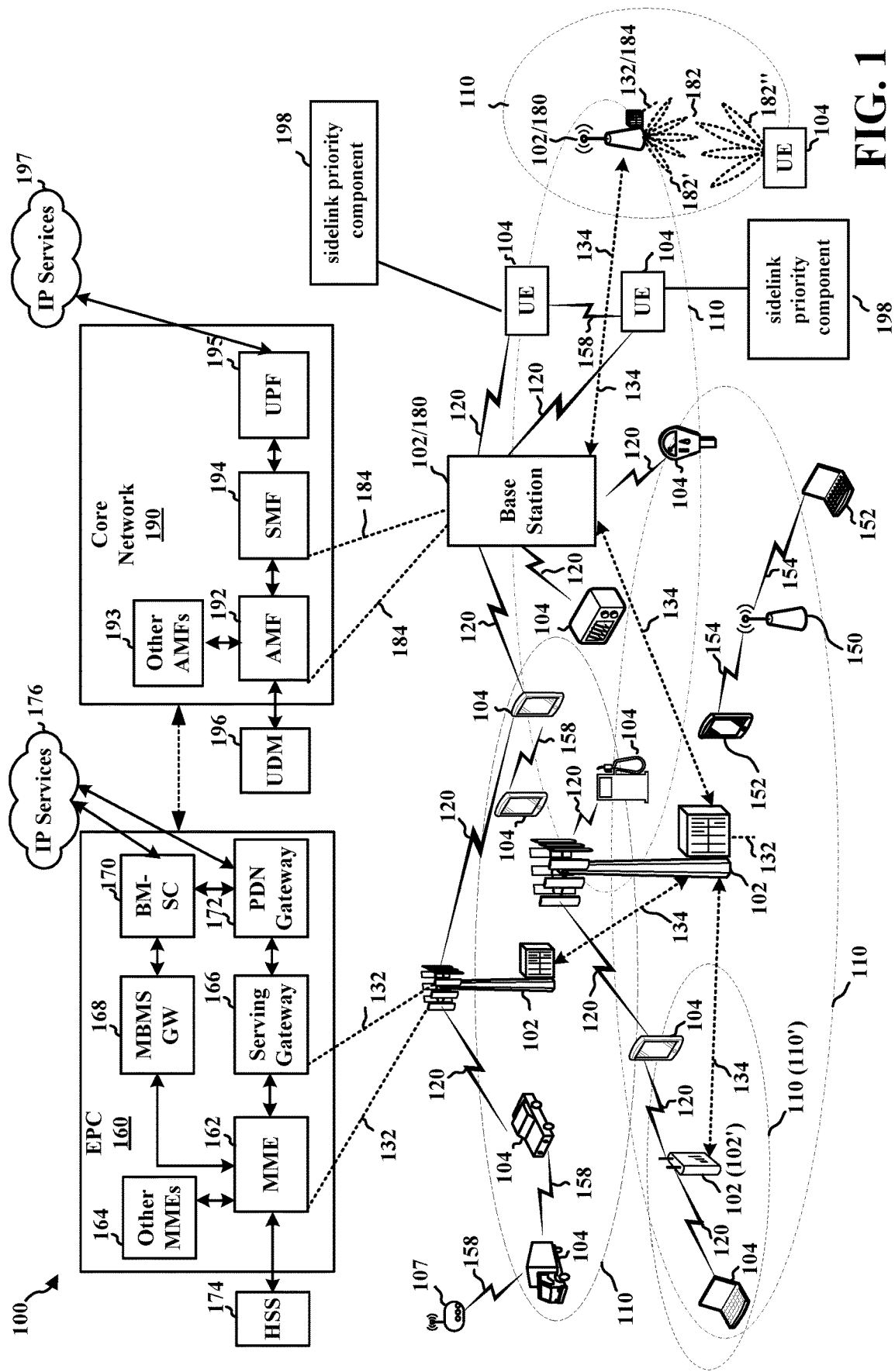
FIG. 1 is a diagram illustrating an example of a wireless communications system and an access network, in accordance with various aspects of the present disclosure.

A user equipment (UE) may have a telematics unit configured to have a first subscriber, a second subscriber, and a vehicle subscriber. The vehicle subscriber and the second subscriber may share the same communication resource, such as a pair of transmission antennas. If an event occurs, the vehicle subscriber may be configured to use the communication resource to transmit a sidelink transmission. For example, the vehicle subscriber may be configured to transmit a sidelink transmission using the shared communication resource in response to an event. However, if the second subscriber is using the communication resource, such as one of the pair of transmission antennas, the vehicle subscriber may be unable to reliably transmit the sidelink transmission. Such a situation may be exacerbated if the UE is traveling at a high speed, as a transmission using more than one transmission antenna may be more reliable than a transmission using only one transmission antenna.

As presented herein, a UE may be configured to maintain the second subscription in an idle mode based on a speed state of the UE. For example, if the speed state of the UE increases to or past a threshold value (e.g. 50 mph), the UE may maintain the second subscription in idle mode until the speed state of the UE decreases to, or below, the threshold value. In other words, the UE may maintain the second subscription in idle mode in response to the speed state of the UE increasing to or past a threshold value until the speed state of the UE decreases to, or below, the threshold value. The UE may then be able to reliably transmit sidelink transmissions at high speeds, as the second subscription may be maintained in idle mode during such times. If the speed state of the UE decreases to or below a threshold value, the UE may maintain the second subscription in an active mode. In other words, the UE may maintain the second subscription in an active mode in response to the speed state of the UE decreasing to or below a threshold value.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that aspects described herein may be practiced in a wide variety of devices, chip-level components, systems, distributed arrangements, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

Referring again to FIG. 1, in certain aspects, a UE 104, or other device communicating based on sidelink, may include a sidelink priority component 198 configured to set a subscription to an idle mode based on a speed state of the UE 104.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. The STAs 152/AP 150 may perform a clear channel assessment (CCA) prior to communicating in an unlicensed frequency spectrum in order to determine whether the channel is available The small cell 102' may operate in a licensed and/or an unlicensed frequency spectrum. For example, the small cell 102' may employ NR and use an unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. Where the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
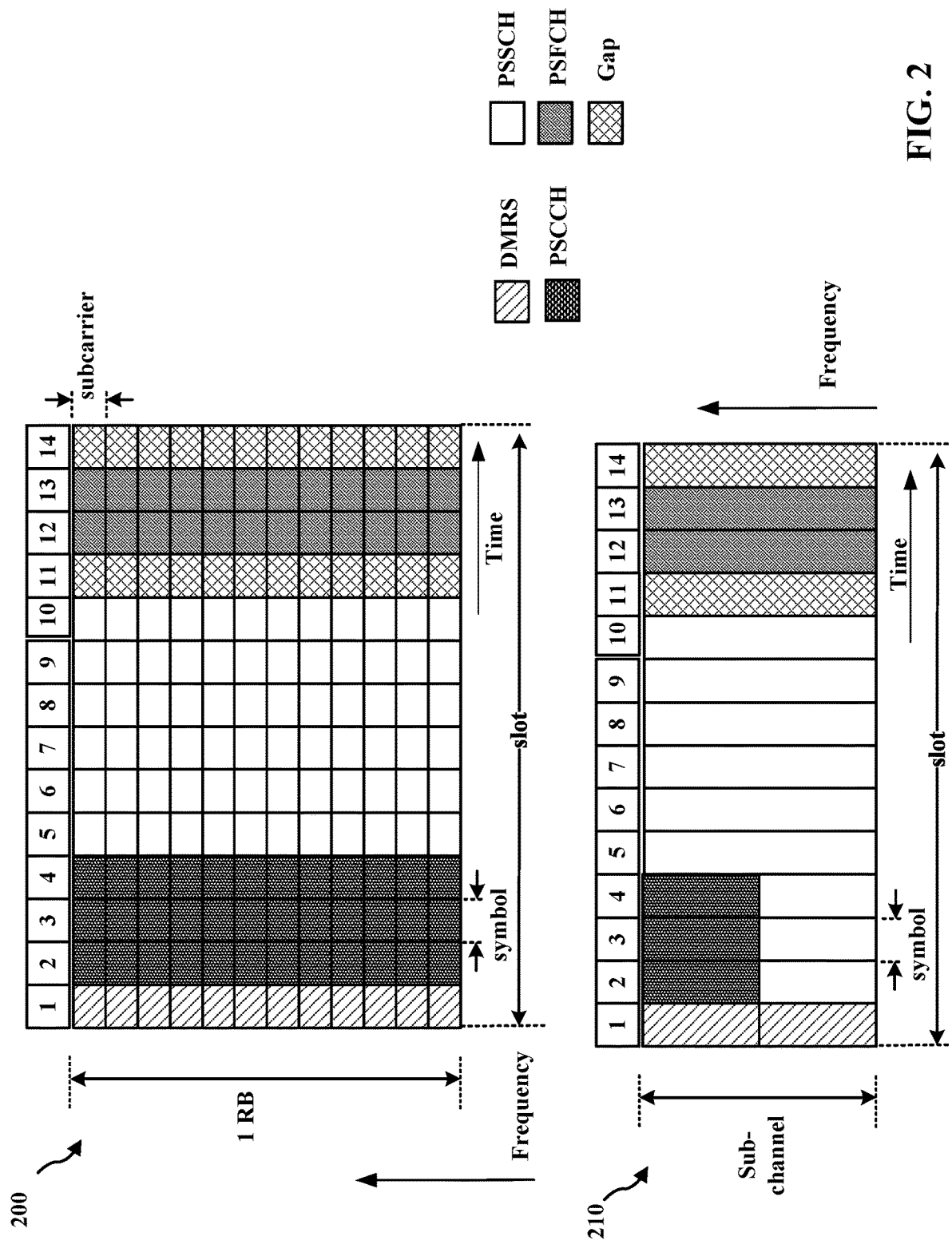
FIG. 2 illustrates example aspects of a sidelink slot structure, in accordance with various aspects of the present disclosure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may include 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information in PSCCH and some REs may include demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may include the data message described herein. The position of any of the data, DMRS, SCI, feedback, gap symbols, and/or LBT symbols may be different than the example illustrated in FIG. 2. Multiple slots may be aggregated together in some aspects.

FIG. 10A is a diagram 1000 illustrating an example of a first subframe within a 5G NR frame structure. FIG. 10B is a diagram 1030 illustrating an example of DL channels within a 5G NR subframe. FIG. 10C is a diagram 1050 illustrating an example of a second subframe within a 5G NR frame structure. FIG. 10D is a diagram 1080 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 10A, 10C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 10A-10D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 10A-10D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 10B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 10A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 10B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 10C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 10D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
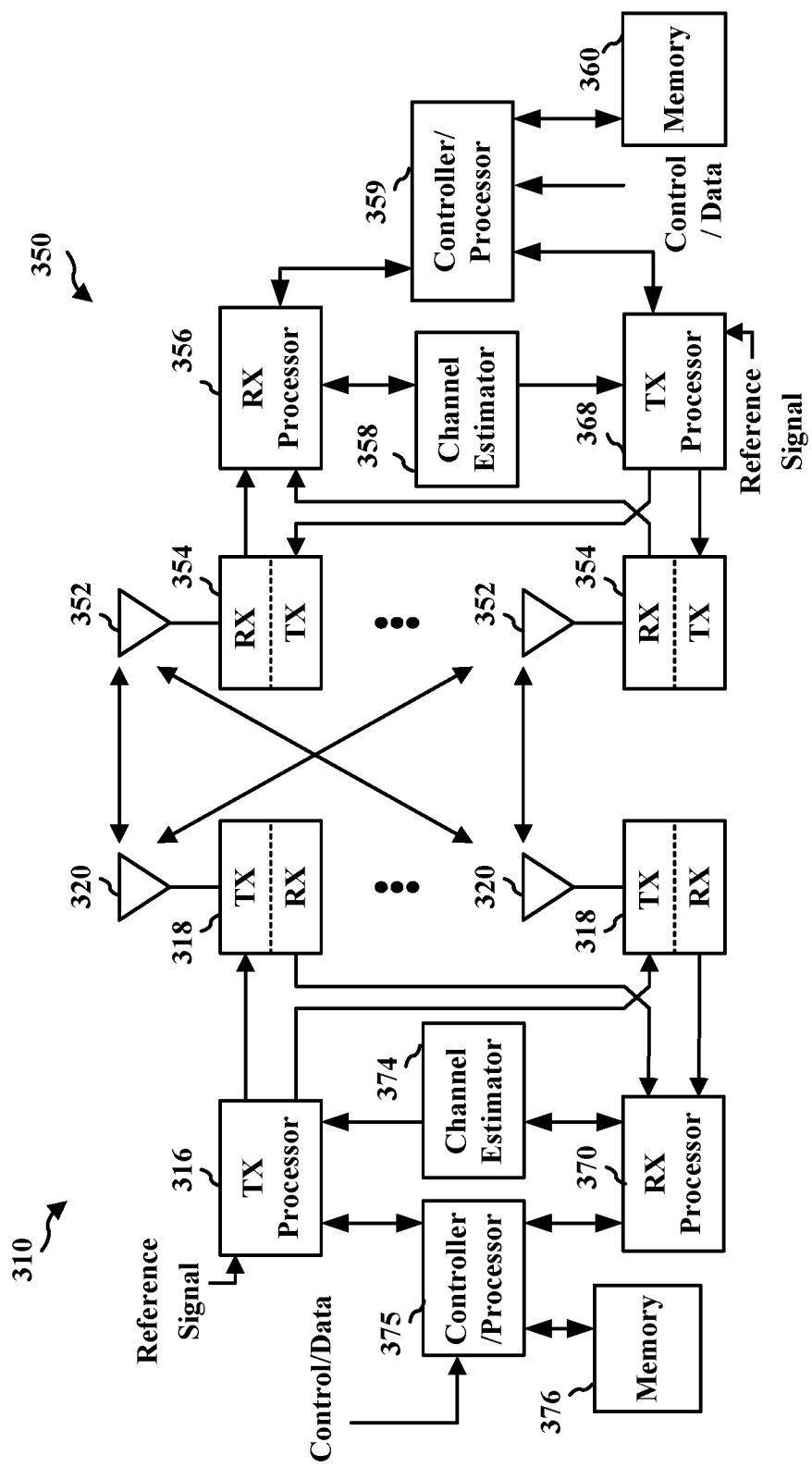
FIG. 3 is a diagram illustrating an example of a first device and a second device involved in wireless communication based, e.g., on sidelink, in accordance with various aspects of the present disclosure.

FIG. 3 is a block diagram of a first wireless communication device 310 in communication with a second wireless communication device 350 based on sidelink.

In some examples, the devices 310 and 350 may communicate based on sidelink, such as V2X or other D2D communication. The communication may be based on sidelink using a PC5 interface. The devices 310 and the 350 may include a UE, an RSU, a base station, etc. As an example, in some aspects, the device 310 may be a UE, and the device 350 may be another UE or an RSU. In some aspects, the devices may communicate over an access link, e.g., based on Uu. As an example, the device 310 may be a base station, and the device 350 may be a UE in some aspects. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (Tx) processor 316 and the receive (Rx) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The Tx processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318 Tx. Each transmitter 318 Tx may modulate an RF carrier with a respective spatial stream for transmission.

At the device 350, each receiver 354 Rx receives a signal through its respective antenna 352. Each receiver 354 Rx recovers information modulated onto an RF carrier and provides the information to the receive (Rx) processor 356. The Tx processor 368 and the Rx processor 356 implement layer 1 functionality associated with various signal processing functions. The Rx processor 356 may perform spatial processing on the information to recover any spatial streams destined for the device 350. If multiple spatial streams are destined for the device 350, they may be combined by the Rx processor 356 into a single OFDM symbol stream. The Rx processor 356 then converts the OFDM symbol stream from the time-domain to the frequency domain using a Fast Fourier Transform (FFT). The frequency domain signal may include a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the Tx processor 368 to select the appropriate coding and modulation schemes, and to facilitate spatial processing. The spatial streams generated by the Tx processor 368 may be provided to different antenna 352 via separate transmitters 354 Tx. Each transmitter 354 Tx may modulate an RF carrier with a respective spatial stream for transmission.

The transmission may be processed at the device 310 in a manner similar to that described in connection with the receiver function at the device 350. Each receiver 318 Rx may receive a signal through its respective antenna 320. Each receiver 318 Rx may recover information modulated onto an RF carrier and may provide the information to a Rx processor 370.

The controller/processor 375 may be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the Tx processor 368, the Rx processor 356, and the controller/processor 359 may be configured to perform aspects in connection with 198 of FIG. 1.

At least one of the Tx processor 316, the Rx processor 370, and the controller/processor 375 may be configured to perform aspects in connection with 198 of FIG. 1.

A telematic apparatus, which may be referred to as a telematic control unit (TCU), may provide wireless communication including wireless communication based on V2X, among other examples. As an example, in the automobile industry a TCU may include a system that may be provided at a vehicle, such as on a vehicle board, and may transmit and receive wireless communication for the vehicle to one or more services via a wireless network such as a cellular network and/or to other vehicles over sidelink, such as based on V2X. The TCU may collect information from a vehicle, e.g., telemetry data, such as position, speed, engine data, or connectivity quality. The data may be collected through interfaces with various sub-systems of the vehicle. The TCU may provide connectivity within the vehicle such as via WiFi, Bluetooth, etc., and may enable voice calls or other wireless communication. Among other example components, a TCU may include a satellite navigation component, e.g., based on a GNSS signal; an interface for mobile communication (GSM, GPRS, Wi-Fi, LTE or 5G), which provides the tracked values to a centralized geographical information system (GIS) database server; an electronic processing unit; a controller; a microprocessor or field programmable gate array (FPGA), which processes the information and acts on the interface between the GPS; a mobile communication unit; and/or memory that may store GPS information or vehicle sensor data among other types of information.

In some aspects, a telematics unit or other wireless communication device may be configured to communicate with at least one wireless device, such as another UE or a BS. The telematics unit or other wireless device may be configured to support a multi-subscriber identity module (SIM) mode, such as a dual SIM dual active (DSDA) mode in which a first subscription (SUB-1) based on a first SIM and a second subscription (SUB-2) based on a second SIM may both be in a radio resource control (RRC) connected state at a same time and transmit, receive, or monitor for communication that overlaps in time. In some aspects, the transmission, reception, or monitoring that overlaps at least partially in time may be referred to as occurring simultaneously. The device may include multiple antennas and transceivers, such as two antennas/transceivers, which enable communication to be transmitted and received by both subscriptions in an overlapping manner. The telematics unit may further support sidelink communication, such as V2X communication. One or more of the subscriptions may communicate based on aspects of the sidelink slot structure in FIG. 2 or the frame structure described in connection with FIGS. 10A-10D.

As an example, a telematics unit may include a chipset that supports both DSDA and sidelink transmissions, such as V2X. For example, a system may have three subscriptions, a first subscription (SUB-1), a second subscription (SUB-2), and a sidelink subscription (SUB-SL). In some aspects, the three subscriptions may be associated with a vehicle. In some aspects, where a user carrying a mobile device is within a range of a vehicle, such as inside the vehicle, the mobile device may pair with the unit of the vehicle. In some aspects, the SUB-1 may be for use to make certain types of communication. As an example, the SUB-1 may provide data about the vehicle to a vehicle manufacturer or to a customer service provider of the vehicle. In some aspects, the SUB-1 may enable a voice call to the vehicle manufacturer or customer service provider. A second subscription, e.g., SUB-2 may enable other wireless communication, such as user access to a wireless network. The user access may include voice calls, the exchange of data, etc. A system may have a plurality of wireless devices configured to pair with one another, such as a first wireless device that includes the SUB-1 and a second wireless device that includes the SUB-2 and the SUB-SL.

SUB-2 and SUB-SL may both share a same set of one or more transmission antennas. As an example, the SUB-2 and the SUB-SL may share a same antenna code or a same RF transceiver card to access two transmission antennas of a UE. Where the SUB-2 is active, one of the two transmission antennas may be in use by the SUB-2 for transmission. For example, SUB-2 may use one of two available antennas for its transmission. If, while SUB-2 is using an antenna, SUB-SL has a transmission in its stack, the transmission from SUB-SL may be limited to transmission using the one available transmission antenna. Transmissions using one antenna, such as transmission diversity (TxD) with chain transmissions or antenna switch diversity (AsDiv) transmissions, may be less reliable than transmissions using two antennas, such as cyclic delay diversity (CDD) transmissions. As an example, in AsDiv, the device may switch between individual antennas for the transmission, using a single antenna at a time, or may simply choose the best antenna to use (i.e., one antenna if only one antenna is free, both antennas if both antennas are free) whereas the UE may simultaneously transmit with multiple antennas in a CDD transmission scheme. For example, the UE may transmit a data transmission via a first antenna with a first cyclic delay (or without a cyclic delay) and may simultaneously transmit the same data via a second antenna with a second cyclic delay. In high doppler environments where the speed of the transmitting UE is different than the speed of a receiving wireless device, using CDD as a transmission scheme may provide more reliable communication over a default AsDiv scheme.

In some aspects, a sidelink transmission, such as a V2X transmission, may be transmitted with a transmission scheme based on a speed. For example, a V2X transmission scheme may be based on a speed of a vehicle. In a high doppler environment, if a doppler measurement meets a threshold, the device may transmit V2X communication using multiple antennas, such as CDD, for the transmission scheme. In other words, the device may transmit V2X communication using multiple antennas in response to a determination that the device is operation in a high doppler environment or in response to a determination that the doppler measurement meets a threshold. Such a doppler measurement may be received from an observing device, such as a BS or a neighboring UE, or may be derived by the UE based on observed pilot signals from other devices, such as a BS or a neighboring UE. Otherwise, the device may transmit V2X communication using a single antenna, such as based on AsDiv. Similarly, the MCS may be based on the device's speed of travel. However, if both SUB-1 and SUB-2 connected in a DSDA mode, the device may not transmit the V2X communication via multiple antennas and may be limited from changing to a V2X transmission scheme based on multiple antennas.

Aspects presented herein may enable improved sidelink communication at high speeds by a UE, such as a telematics unit, allowing for a multiple antenna transmission scheme for sidelink communication such as V2X communication. For example, a UE may be configured to maintain the second subscription in an idle mode based on a speed state of the UE. The UE may then be able to more reliably transmit sidelink transmissions at high speeds, as the second subscription may be maintained in idle mode during such times. The UE may be configured to maintain the second subscription in an idle mode by disabling the second subscription or by using a first subscription instead of the second subscription to perform tasks, such as connecting a phone call or transferring data. The first subscription may be disposed in a separate device from the second subscription and a sidelink subscription, such as a driver's mobile device or a passenger's mobile device, or may be disposed as part of the same device as the second subscription and the sidelink subscription, such as a multi-SIM DSDA device.

The UE may be configured to keep SUB-2 in an idle mode in response to a determination that the UE is in a high-speed state. The UE may determine that it is in a high-speed state via a plurality of ways, for example if the UE speeds up to be at or over a threshold speed, if the environment parameters indicate a dynamic state (e.g., the UE's speed differential within a time period is at or over a speed difference threshold), if the UE's speed and a speed of a neighboring UE exceeds a speed differential threshold, if a doppler indication is received that indicates a high doppler environment, or if a pilot message is received from another UE that may be analyzed to derive a that the UE is in a high doppler environment. In other words, the UE may determine that it is in a high-speed state in response to a determination that any of the aforementioned triggers exists. The UE may keep SUB-2 in an idle mode by ensuring that SUB-2 does not monopolize control of at least one of two transmission antennas that are shared by SUB-2 and SUB-SL.

If the UE determines that it is in a high-speed state, the UE may be configured to transmit sidelink messages in a way that increases reliability at a receiver. In other words, the UE may be configured to transmit sidelink messages in a way that increases reliability at a receiver in response to the UE determining that it is in a high-speed state. For example, based on the ongoing activity on a SUB-2 and a criticality of a sidelink safety message, transmission of a sidelink message may be prioritized over transmission of a SUB-2 message.

Figure 4:
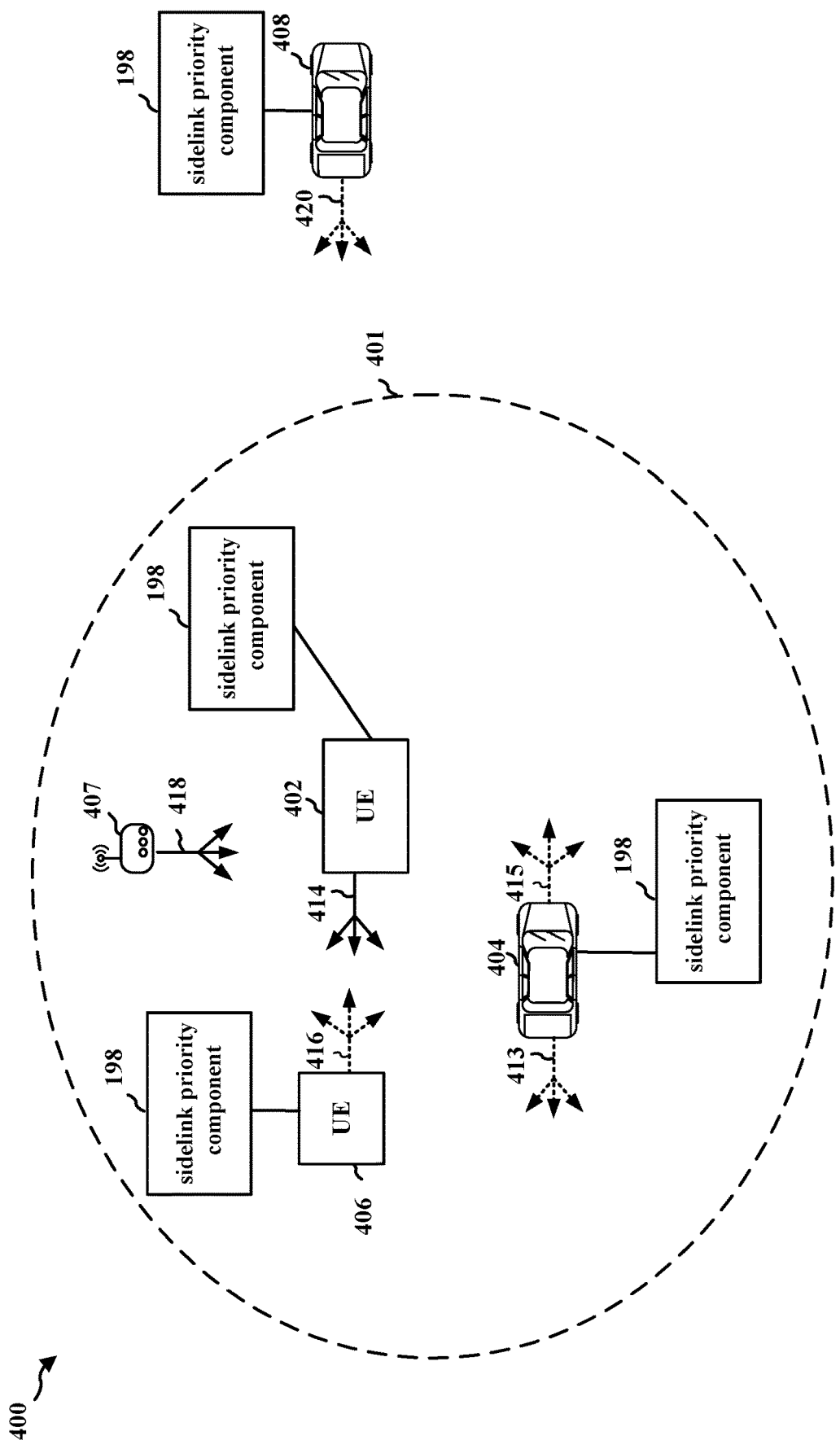
FIG. 4 illustrates example aspects of sidelink communication between devices, in accordance with aspects presented herein.

FIG. 4 illustrates an example 400 of sidelink communication between devices. V2X is an example of sidelink communication. The communication may be based on a slot structure including aspects described in connection with FIG. 2. For example, the UE 402 may transmit a sidelink transmission 414 having a control channel (e.g., PSCCH) and/or a corresponding data channel (e.g., PSSCH), that may be received by another device, such as UEs 404, 406, 408. A control channel may include information (e.g., sidelink control information (SCI)) for decoding the data channel, including reservation information, such as information about time and/or frequency resources that may be reserved for the data channel transmission. For example, the SCI may indicate a number of TTIs, as well as the RBs that will be occupied by the data transmission. The SCI may also be used by receiving devices to avoid interference by refraining from transmitting on the reserved resources.

A sidelink transmission may be event-driven. In other words, a UE, such as the UEs 402, 404, 406, 408, may be configured to transmit a sidelink transmission in response to a detected event. For example, a brake hard event may trigger a sidelink transmission to be transmitted to notify one or more nearby devices that a brake hard event occurred, or a change lanes event may trigger a sidelink transmission to be transmitted to notify one or more nearby devices that a change lane event occurred.

Additionally, or alternatively, a UE, such as the UEs 402, 404, 406, 408, may be configured to transmit a sidelink transmission periodically. For example, a UE may be configured to transmit a vehicle speed every minute or may be configured to transmit a location every 30 seconds.

The UEs 402, 404, 406, 408 may each be capable of sidelink transmission in addition to sidelink reception. UEs 404, 406, 408 are illustrated as transmitting sidelink transmissions 413, 415, 416, 420. The sidelink transmissions 413, 414, 415, 416, 420 may be unicast, broadcast or multicast to nearby devices. For example, UE 404 may transmit communication transmissions 413, 415 intended for receipt by other UEs within a range 401 of UE 404, and UE 406 may transmit communication transmission 416. Additionally, or alternatively, RSU 407 may receive communication from and/or transmit communication 418 to UEs 402, 404, 406, 408. One or more of the UEs 402, 404, 406, 408 or the RSU 407 may include a sidelink priority component 198 as described in connection with FIG. 1.

Sidelink communication may be based on different types or modes of resource allocation mechanisms. In a first resource allocation mode (which may be referred to herein as "Mode 1"), centralized resource allocation may be provided by a network entity. For example, a base station 102 or 180 may determine resources for sidelink communication and may allocate resources to different UEs 104 to use for sidelink transmissions. In this first mode, a UE receives the allocation of sidelink resources from the base station 102 or 180. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink, may determine one or more radio resources in the time and frequency domain that are used by other devices in order to select transmission resources that avoid collisions with other devices.

Figure 5:
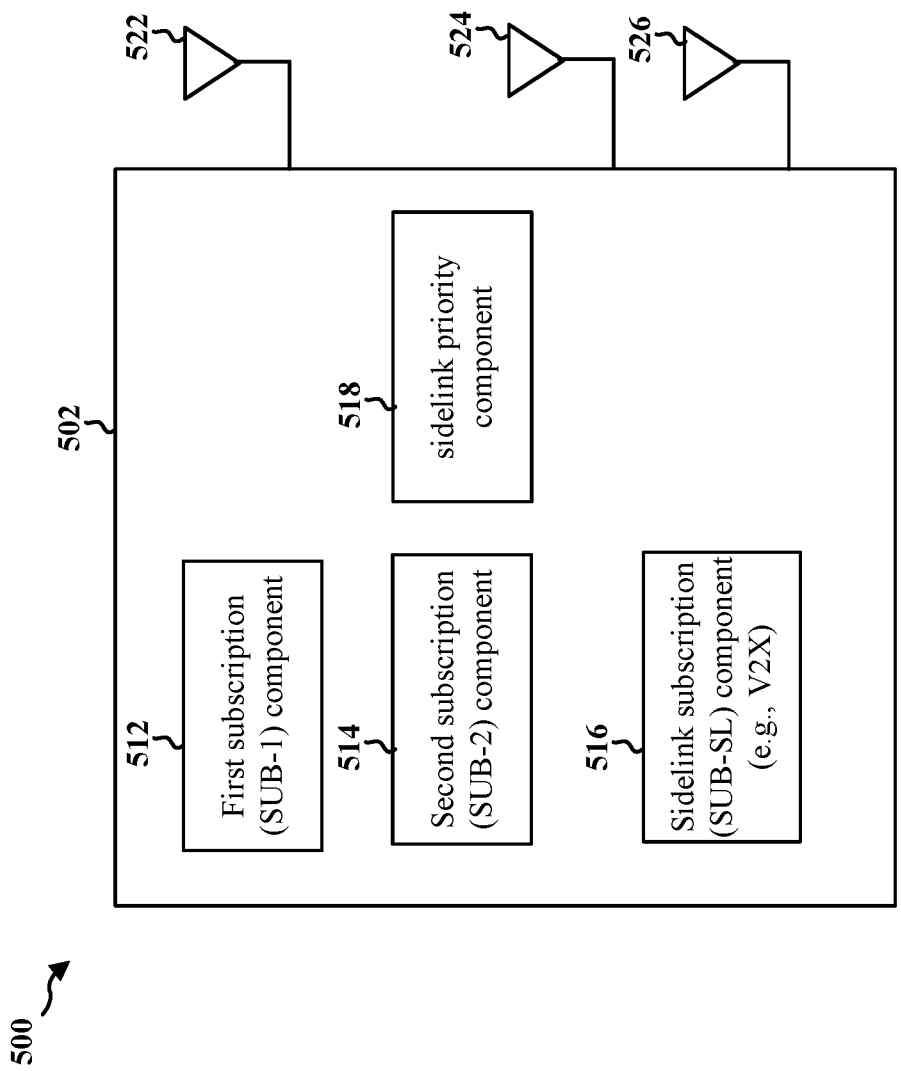
FIG. 5 is a diagram illustrating an example of a UE having two antenna resources which may be used for a subscription call or for a sidelink transmission, in accordance with various aspects of the present disclosure.

FIG. 5 is a diagram 500 showing a UE 502 having a SUB-1 component 512, a SUB-2 component 514, a SUB-SL component 516, a sidelink priority component 518, a first set of antennas 522, a second set of antennas 524, and a third set of antennas 526.

Each set of antennas 522, 524, and 526 may comprise one or more antennas that may be used by a subscription to wirelessly transmit or receive messages. The SUB-1 component 512, SUB-2 component 514, and SUB-SL component 516 may each include a SIM card configured to provide subscription and account information. The first set of antennas 522 may have an antenna code or an RF transceiver card that may be assigned to the SUB-1 component 512 to transmit and receive communications with other wireless devices. For example, the first set of antennas 522 may have an antenna capable of making and receiving phone calls, or may have an antenna that may connect to another device, such as a vehicle, which may make and receive voice calls on behalf of the SUB-1 component 512, for example a call with a vehicle manufacturer or a call with a customer service provider. The SUB-1 component 512 may be configured to control, for example, a vehicle driver's hands-free telephone. The first set of antennas 522 may comprise a set of antennas where one or more antennas are capable of transmission. The first set of antennas 522 may be used by the SUB-1 component 512 to make and receive phone calls or exchange data.

The second set of antennas 524 and the third set of antennas 526 may have a shared antenna code or RF transceiver card that may be assigned to both the SUB-2 component 514 and the SUB-SL component 516 to make and receive wireless communications, for example a TxD with Chain using one of the second set of antennas 524 or one of the third set of antennas 526 or a CDD using both the second set of antennas 524 and the third set of antennas 526. Alternatively, the second set of antennas 524 may have its own antenna code or RF transceiver card and the third set of antennas 526 may have its own antenna code or RF transceiver card, which may both be assigned to both the SUB-2 component 514 and the SUB-SL component 516 to make and receive wireless communications. The UE 502 may be configured to communicate in a DSDA mode where each of the SUB-1 component 512 and SUB-2 component 514 may be active at the same time. The UE 502 may be configured to communicate in a DSDA mode where each of the SUB-1 component 512, SUB-2 component 514, and SUB-SL component 516 may be active at the same time.

While the UE 502 is shown as a single device, the UE 502 may also comprise separate devices, such as a telematics device comprising the SUB-2 component 514, the SUB-SL component 516, the sidelink priority component 518, the second set of antennas 524, and the third set of antennas 526 that pairs with a mobile device comprising the SUB-1 component and the first set of antennas 522. The second set of antennas 524 and the third set of antennas 526 may each include at least one transmission antenna, such that the SUB-SL component 516 may have control of both the second set of antennas 524 and the third set of antennas 526 and therefore may transmit a CDD message using two transmission antennas simultaneously at any time without needing to wait for the SUB-2 component 514 to finish a transmission.

The sidelink priority component 518 may be configured to prioritize messages from the SUB-SL component 516 under specific conditions. For example, based on the ongoing activity on the SUB-2 component 514 and attributes of messages from the SUB-SL component 516 (e.g., criticality metric of V2X safety messages or other sidelink message), a message from the SUB-SL component 516 may be prioritized over a message from the SUB-2 component. Under high-speed conditions, e.g., above a speed threshold, the sidelink priority component 518 may be configured to provide control over the second set of antennas 524 and the third set of antennas 526 to the SUB-SL component 516. The sidelink priority component 518 may receive an RRC configuration message that indicates the speed state threshold for a UE as an absolute speed.

The sidelink priority component 518 may be configured to determine that the UE 502 is traveling at a high-speed state in a plurality of ways. For example, the sidelink priority component 518 may receive data from an accelerometer, a global positioning system (GPS) device, or from a vehicle functionally connected to the UE 502 that indicates a speed of the UE 502, and the sidelink priority component 518 may determine that the UE 502 is traveling at a high speed if the detected speed of the UE meets or exceeds a threshold value. The sidelink priority component 518 may receive or derive environment parameters from one or more sensors or communications (e.g. sidelink communications from other vehicles) that may indicate a dynamic state. For example, the sidelink priority component 518 may receive or derive an environment parameter that the vehicle's speed differential within a time period meets or exceeds a threshold value, or may receive sidelink communications from other vehicles that a number of vehicles around the UE 502 that have changed within a time period meets or exceeds a threshold value, or may receive or compute based upon received sidelink communications from other vehicles that indicate that the speed differential between two or more vehicles, including the one associated with the UE 502, meets or exceeds a threshold value. The sidelink priority component 518 may also measure doppler effects to determine that the UE 502 has entered into a high-speed state. For example, another UE may be configured to transmit a pilot message to the UE 502, which the sidelink priority component 518 may analyze to derive a doppler estimate response. The UE 502 may be configured to solicit such pilot messages to neighboring UEs by broadcasting or unicasting a solicitation message to one or more neighboring UEs to transmit a pilot message to the UE 502 for such doppler measurements.

If the sidelink priority component 518 determines that the UE 502 is in a high-speed state, the sidelink priority component 518 may place the SUB-2 component 514 in idle mode to prioritize messages from the SUB-SL component 516 over messages from the SUB-2 component 514. In other words, the sidelink priority component 518 may place the SUB-2 component 514 in idle mode in response to the sidelink priority component 518 determining that the UE 502 is in a high-speed state. For example, the sidelink priority component 518 may be configured to automatically forward incoming calls to the SUB-2 component 514 to the SUB-1 component 512. Additionally, or alternatively, the sidelink priority component 518 may be configured to transfer an ongoing call using the SUB-2 component 514 or an incoming call to the SUB-2 component 514 to the SUB-1 component 512 if the ongoing call was active during a time that the UE 502 enters the high-speed state. Additionally, or alternatively, the sidelink priority component 518 may be configured to transfer an ongoing call using the SUB-2 component 514 or an incoming call to the SUB-2 component 514 to any other subscription component (e.g., to another phone number of that a user inputs into a user interface of the UE 502, such as a passenger's phone number) if the ongoing call was active during a time that the UE 502 enters the high-speed state. Additionally, or alternatively, the sidelink priority component 518 may be configured to place a call made using the SUB-2 component 514 using the SUB-1 component 512. Additionally, or alternatively, the sidelink priority component 518 may be configured to place an ongoing call using the SUB-1 component 512 on hold to allow the SUB-2 component 514 to make or receive a phone call using the SUB-1 component 512. Additionally, or alternatively, the sidelink priority component 518 may be configured to allow a user of the UE 502 to conference an incoming or outgoing call to or from the SUB-2 component 514, respectively, with an ongoing call of the SUB-1 component 512 and host the conference call using the SUB-1 component 512. Additionally, or alternatively, the sidelink priority component 518 may be configured to deny any voice calls to or from the UE 502 component 514 while in a high-speed mode. The sidelink priority component 518 may be configured to provide a user of the UE 502 a warning, for example via a user interface of the UE 502, that telephony using the UE 502 while in the high-speed state may be risky. Additionally, or alternatively, the sidelink priority component 518 may be configured to, if the SUB-2 component 514 is in the middle of a data transfer, tune away from the SUB-2 component 514 to the SUB-1 component 512 to provide an antenna lock to the SUB-SL component 516. Without such a lock, the SUB-SL component 516 may not be able to use both of the sets of antennas 524 and 526 if the SUB-2 component 514 is using one of the two sets of antennas 524 or 526, for example by using an antenna for a voice call. Such a lock may provide the SUB-SL component 516 control over both of the sets of antennas 524 and 526, where the SUB-SL component 516 may give or revoke permission to the SUB-2 component 514 to use one of the sets of antennas 524 and 526, or may take actions on behalf of the SUB-2 component 514 (e.g., transmitting data from a stack of the SUB-2 component 514). The SUB-SL component 516 may then be able to continue the data transfer for the SUB-2 component 514, while also performing transmission using both of the sets of antennas 524 and 526. For example, the SUB-SL component 516 may pause the data transfer for the SUB-2 component 514, then transmit a V2X message via CDD, and then may continue the data transfer after transmission of the message. Additionally, or alternatively, while the SUB-SL component 516 has control over both of the sets of antennas 524 and 526, the SUB-SL component 516 may be configured to transmit either a first transmission or a re-transmission (ReTx) using a high-reliability transmissions scheme, such as CDD. Such a transmission may use both of the sets of antennas 524 and 526. Additionally, or alternatively, the SUB-SL component 516 may be configured to transmit either a first transmission or a re-transmission (ReTx) using a low-reliability transmissions scheme, such as TxD. Such a transmission may use one of the two sets of antennas 524 and 526. Any of the actions taken by the sidelink component 518 to maintain the SUB-2 component 514 in idle mode may be automatically taken if the sidelink component 518 detects that the UE 502 has changed from a low-speed state to a high-speed state, and may be reversed if the sidelink component 518 detects that the UE 502 has changed from a high-speed state to a low-speed state. In other words, any of the actions taken by the sidelink component 518 to maintain the SUB-2 component 514 in idle mode may be automatically triggered in response to a determination that the UE 502 has changed from a low-speed state to a high-speed state, and may be reversed in response to a determination that the sidelink component 518 detects that the UE 502 has changed from a high-speed state to a low-speed state.

Allowing the SUB-SL component 516 to use a high reliability transmissions scheme (e.g., CDD using two antennas) over a low reliability transmissions scheme (e.g., TxD using one antenna) may provide better results under certain environmental conditions for the UE 502. By allowing the SUB-SL component 516 to transmit messages of high importance, such as critical V2X messages, while in a high-speed state, the reliability of such messages may be increased under high-doppler scenarios.

Figure 6:
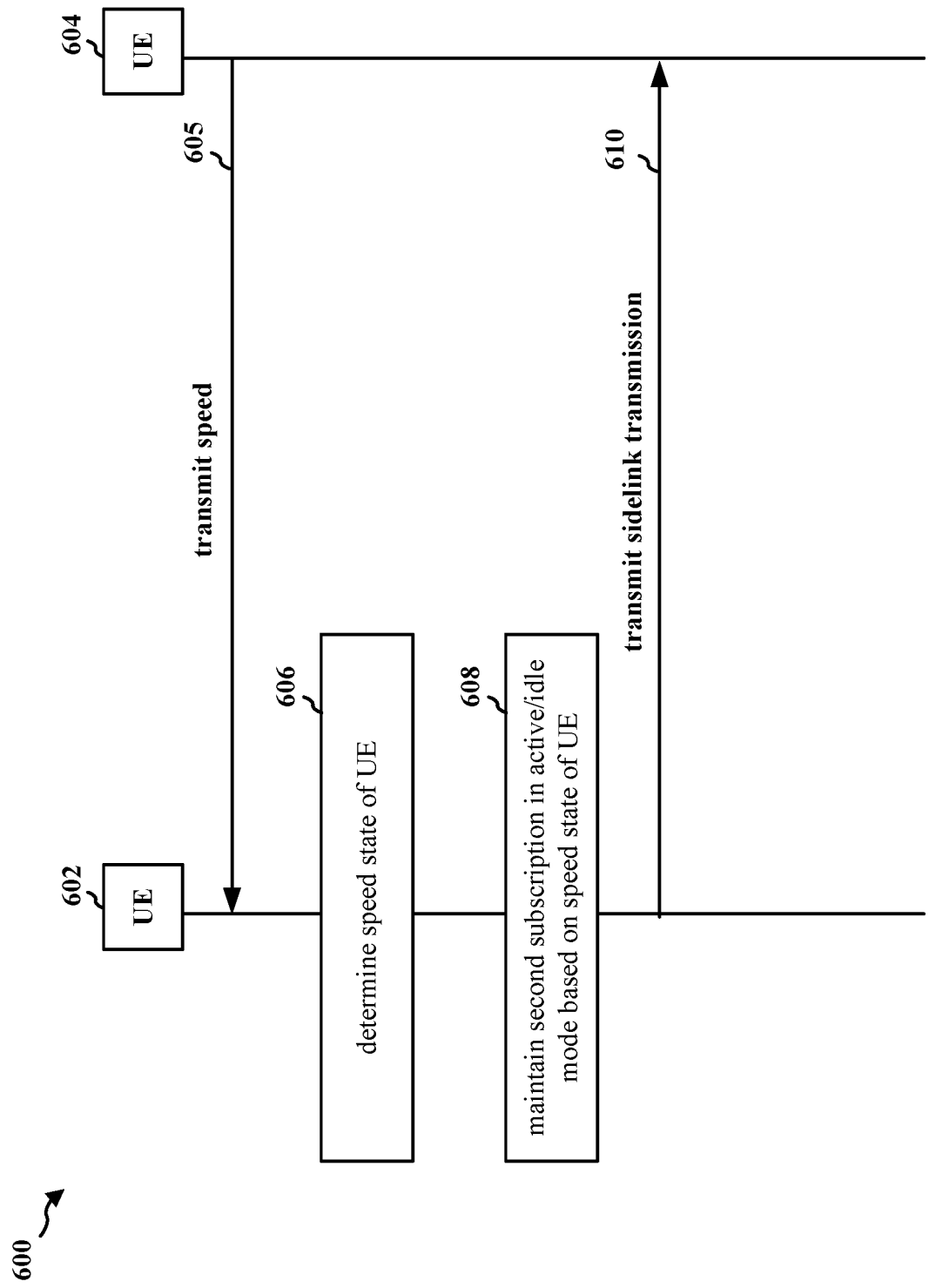
FIG. 6 is a network connection flow diagram that illustrates an example of a UE, in accordance with various aspects of the present disclosure.

FIG. 6 shows a network connection flow diagram 600 having a UE 602 configured to transmit a sidelink transmission 610 to another UE 604. The sidelink transmission may be a unicast, broadcast, or multicast transmission. The sidelink transmission may include a V2X message. The UE 602 may determine 606 a speed state of the UE 602, such as a high-speed state or a low-speed state. For example, the UE 604 may transmit a pilot signal 605 to the UE 602, which may allow the UE 602 to derive a high-doppler condition based upon a detected frequency shift in the received pilot signal 605.

Additionally, or alternatively, the UE 604 may transmit a pilot signal 605 containing a speed and/or a direction of the UE 602, which the UE 602 may use to calculate a relative speed difference between the UE 602 and the UE 604 and determine whether that relative speed difference exceeds a speed threshold value. The UE 602 may be configured to determine 606 a speed state of the UE 602 in any manner described above. If the UE 602 determines 606 that the UE 602 is not in a high-speed state, the UE may maintain 608 the SUB-2 in an active mode. For example, the UE 602 may allow either the SUB-2 or the SUB-SL to use one or both antennas that are shared between the SUB-2 and the SUB-SL. If the UE 602 determines 606 that the UE 602 is in a high-speed state, the UE may maintain 608 the SUB-2 in an idle mode. For example, the UE 602 may lock two antennas to the SUB-SL, ensuring that the SUB-SL determines when transmissions from or two the SUB-2 are transmitted or received. The UE 602 may transmit 610 a sidelink transmission to the UE 604 based upon whether the SUB-2 is in active or idle mode. For example, if the SUB-2 is in idle mode, the UE 602 may transmit 610 a sidelink transmission using a high-reliability transmission scheme, such as CDD. If the SUB-2 is in active mode, but the SUB-2 is not currently using either antenna shared by both the SUB-SL and the SUB-2, the UE 602 may transmit 610 a sidelink transmission using a high-reliability transmission scheme, such as CDD. If the SUB-2 is in active mode, and the SUB-2 is currently using an antenna shared by both the SUB-SL and the SUB-2, for example by engaging in a call, the UE 602 may transmit 610 a sidelink transmission using a low-reliability transmission scheme, such as TxD with chain.

Figure 7:
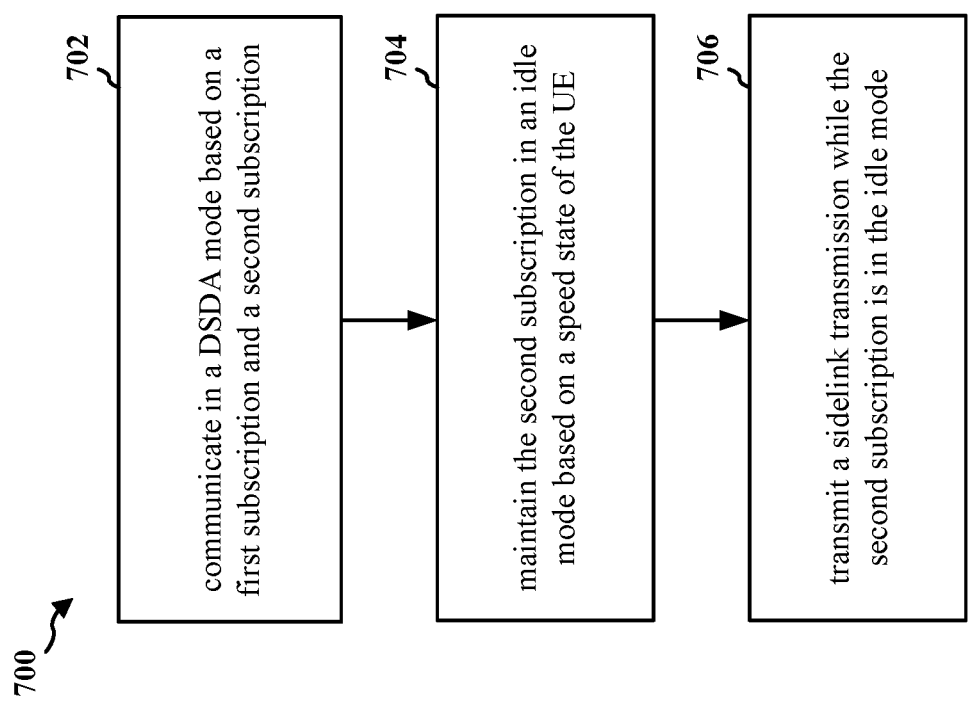
FIG. 7 is a flowchart of a method of wireless communication, in accordance with various aspects of the present disclosure.

FIG. 7 shows a flowchart 700 of a method of wireless communication. The method may be performed by a UE (e.g., the UE 104, wireless communication device 310, wireless communication device 350, UE 402, UE 404, UE 406, UE 408, UE 502, or UE 602).

At 702, the UE may communicate in a DSDA mode based on a first subscription and a second subscription. For example, the UE 502 in FIG. 5 may communicate in a DSDA mode based on a SUB-1 component 512 or based on a SUB-2 component 514. Further, 702 may be performed by the sidelink priority component 518 in FIG. 5 or the sidelink priority component 940 in FIG. 9.

At 704, the UE may maintain the second subscription in an idle mode based on a speed state of the UE. For example, the sidelink priority component 518 in FIG. 5 may maintain the SUB 2 component 514 in an idle mode based on a speed state of the UE 502. Further, 704 may be performed by the sidelink priority component 940 in FIG. 9.

At 706, the UE may transmit a sidelink transmission while the second subscription is in the idle mode. For example, the SUB-SL component 516 in FIG. 5 may transmit a sidelink transmission using one or both of the set of antennas 524 and the set of antennas 526 while the SUB-2 component 514 is in the idle mode. Further, 706 may be performed by the sidelink priority component 518 in FIG. 5 or the sidelink priority component 940 in FIG. 9.

In some aspects, to transmit the sidelink transmission includes transmitting the sidelink transmission using multiple antennas in response to the speed state of the UE. For example, the SUB-SL component 516 in FIG. 5 may transmit the sidelink transmission using both the set of antenna 524 and the set of antenna 526 in response to the speed state of the UE 502.

In some aspects, the UE may transmit the sidelink transmission includes transmitting the sidelink transmission using a CDD transmission scheme based on the speed state of the UE. For example, the SUB-SL component 516 may transmit the sidelink transmission using a CDD transmission scheme based on the speed state of the UE 502.

In some aspects, to maintain the second subscription in the idle mode includes transitioning the second subscription to the idle mode in response to the speed state of the UE meeting a speed state threshold. For example, the sidelink priority component 518 in FIG. 5 may transition the SUB-2 component 514 to the idle mode in response to the speed state of the UE 502 meeting a speed state threshold.

In some aspects, the speed state is based on a speed of the UE. For example, the sidelink priority component 518 in FIG. 5 may base the speed state off of a speed of the UE 502.

In some aspects, the speed state is based on a Doppler level observed by the UE. For example, the sidelink priority component 518 in FIG. 5 may base the speed state off of a derived doppler level associated with the UE 502 based off of received signals from one or more received messages.

In some aspects, to maintain the second subscription in the idle mode includes forwarding an incoming call for the second subscription to the first subscription or placing an outgoing call via the first subscription instead of the second subscription. For example, the sidelink priority component 518 in FIG. 5 may forward an incoming call for the SUB-2 component 514 to the SUB-1 component 512. Alternatively, or additionally, the sidelink priority component 518 in FIG. 5 may place an outgoing call using the SUB-1 component 512 instead of the SUB-2 component 514.

In some aspects, to maintain the second subscription in the idle mode further includes placing an ongoing call on the first subscription on hold. For example, the sidelink priority component 518 in FIG. 5 may place an ongoing call on the SUB-1 component 512 on hold. In some aspects, to maintain the second subscription in the idle mode further includes forwarding an ongoing call via the second subscription to the first subscription. For example, the sidelink priority component 518 in FIG. 5 may forward an ongoing call on the SUB-2 component 514 to the SUB-1 component 512.

In some aspects, the UE may be further configured to maintain the second subscription in an active mode if the speed state of the UE comprises a low-speed state and automatically forward an ongoing call via the second subscription to the first subscription if the speed state of the UE changes from a low-speed state to a high-speed state. In other words, the UE may be further configured to maintain the second subscription in an active mode in response to a determination that the UE has a low-speed state and automatically forward an ongoing call via the second subscription to the first subscription in response to a determination that the UE changes from a low-speed state to a high-speed state. For example, the sidelink priority component 518 in FIG. 5 may be configured to maintain the SUB-2 component 514 in active mode if the speed state of the UE 502 is a low-speed state at or below a speed threshold, and may be configured to automatically forward an ongoing call via the SUB-2 component 514 to the SUB-1 component 512 (or to any other subscription of a user's choosing) if the speed state of the UE 502 changes from a low-speed state to a high-speed state at or above a speed threshold. In other words, the sidelink priority component 518 may be configured to maintain the SUB-2 component 514 in active mode in response to a determination that the UE 502 is traveling at a speed at or below a speed threshold, and may be configured to automatically forward an ongoing call via the SUB-2 component 514 to the SUB-1 component 512 (or to any other subscription of a user's choosing) in response to a determination that the speed state of the UE 502 changes from a low-speed state to a high-speed state at or above a speed threshold.

In some aspects, the UE may be configured to maintain the second subscription in the idle mode by forwarding an incoming call for the second subscription to a third subscription configured by a user of the UE. For example, the sidelink priority component 518 in FIG. 5 may be configured to maintain the SUB-2 component 514 in idle mode by forwarding any incoming call for the SUB-2 component 514 to a third subscription configured by a user of the UE 502.

In some aspects, the UE may be configured to maintain the second subscription in the idle mode by rejecting a mobile originated voice call on the second subscription based on the speed state of the UE. For example, the sidelink priority component 518 in FIG. 5 may be configured to not allow a mobile originated voice call using the SUB-2 component 514 based on the speed state of the UE 502.

In some aspects, the UE may be configured to maintain the second subscription in the idle mode by displaying a message based on the speed state of the UE. For example, the sidelink priority component 518 in FIG. 5 may be configured to display a message that outgoing calls may not be allowed using the SUB-2 component 514 based on the speed state of the UE 502.

In some aspects, to maintain the second subscription in the idle mode further includes pausing a data transfer on the second subscription to transmit the sidelink transmission using multiple antennas. For example, the sidelink priority component 518 in FIG. 5 may be configured to pause a data transfer using the SUB-2 component 514 to allow the SUB-SL component 516 to transmit a sidelink transmission using both of the sets of antennas 524 and 526.

In some aspects, to maintain the second subscription in the idle mode further includes tuning away from communication on the second subscription to transmit one of an initial transmission or a retransmission of the sidelink transmission using multiple antennas. For example, the sidelink priority component 518 in FIG. 5 may be configured to tune away from communication on the SUB-2 component 514 to transmit an initial transmission of a sidelink transmission of the SUB-SL component 516 using both of the sets of antennas 524 and 526. Alternatively, or additionally, the sidelink priority component 518 in FIG. 5 may be configured to tune away from communication on the SUB-2 component 514 to transmit a ReTx of a sidelink transmission of the SUB-SL component 516 using both of the sets of antennas 524 and 526.

In some aspects, the UE may be configured to transmit another of the initial transmission or the retransmission using a single antenna. For example, the sidelink priority component 518 in FIG. 5 may be configured to transmit another of the initial transmission or the retransmission using one of the two sets of antennas 524 and 526.

In some aspects, the sidelink transmission may include a vehicle to everything (V2X) message. For example, the UE 602 of FIG. 6 may transmit 610 a V2X sidelink transmission to the UE 604.

Figure 8:
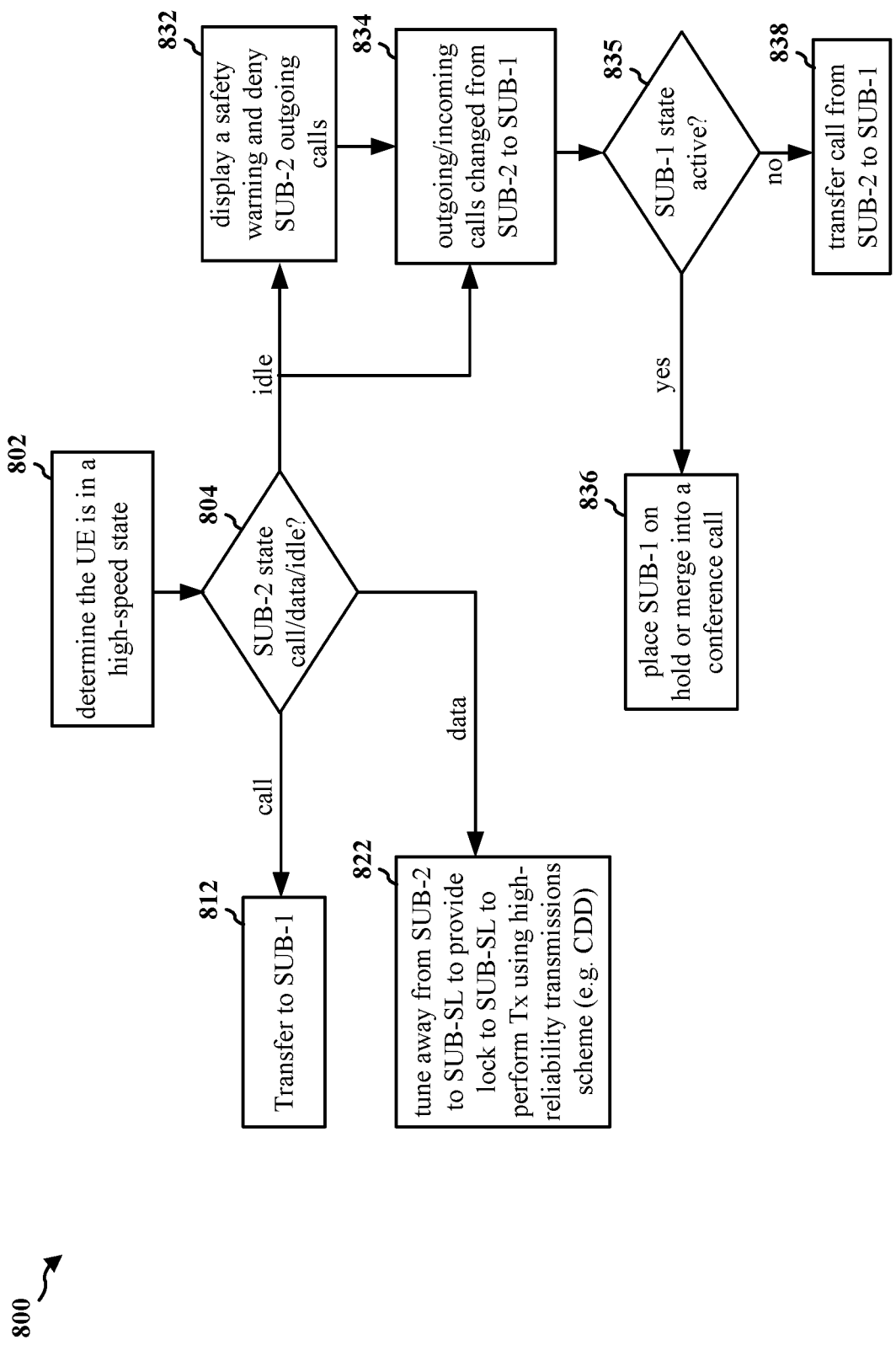
FIG. 8 is another flowchart of a method of wireless communication, in accordance with various aspects of the present disclosure.

FIG. 8 shows a flowchart 800 of another method of wireless communication. The method may be performed by a UE (e.g., the UE 104, wireless communication device 310, wireless communication device 350, UE 402, UE 404, UE 406, UE 420, UE 502, or UE 602).

At 802, the UE may determine that the UE is in a high-speed state. For example, the UE 502 in FIG. 5 may determine that the UE 502 is in a high-speed state in a plurality of ways describe above. Further, 702 may be performed by the sidelink priority component 518 in FIG. 5 or the sidelink priority component 940 in FIG. 9. Further, 802 may be performed by the sidelink priority component 518 in FIG. 5 or the sidelink priority component 940 in FIG. 9.

At 804, the UE may determine whether a state of the SUB-2 component, for example whether the SUB-2 component is in a call state (i.e., active in an ongoing call), a data transfer state (i.e., active transferring data with another wireless device), or an idle state (i.e., inactive). For example, the UE 502 in FIG. 5 may determine whether the SUB-2 component 514 is actively in a call, is actively transferring data, or is inactive. Further, 804 may be performed by the sidelink priority component 518 in FIG. 5 or the sidelink priority component 940 in FIG. 9.

If the UE determines that the SUB-2 component is in a call, at 812 the UE may transfer the call to SUB-1. For example, the sidelink priority component 518 in FIG. 5 may transfer an ongoing call using the SUB-2 component 514 to the SUB-1 component 512. If the SUB-1 component is also on an ongoing call, the sidelink priority component 518 may place the ongoing call using the SUB-1 component 512 on hold, or may conference the ongoing call using the SUB-2 component 514 with the ongoing call using the SUB-1 component 512. Further, 812 may be performed by or the sidelink priority component 940 in FIG. 9.

If the UE determines that the SUB-2 component is transferring data, at 822 the UE may tune away from SUB-2 to SUB-SL to provide lock to SUB-SL to perform a transfer using high-reliability transmissions scheme. For example, the sidelink priority component 518 in FIG. 5 may tune away a data transfer using the SUB-2 component 514 to the SUB-SL component 516 to provide a lock to the sets of antennas 524 and 526 to the SUB-SL component 516. The SUB-SL component 516 may then perform a transfer using one or both of the sets of antennas 524 and 526 using a high-reliability transmissions scheme, such as CDD. Further, 822 may be performed by the sidelink priority component 940 in FIG. 9.

If the UE determines that the SUB-2 component is idle, at 832 the UE may display a safety warning and deny SUB-2 outgoing calls. For example, the sidelink priority component 518 in FIG. 5 may display a safety warning to a display of the UE 502 and may deny a user of the UE 502 from placing any outgoing calls using the SUB-2 component 514. Further, 804 may be performed by the sidelink priority component 940 in FIG. 9.

Alternatively, if the UE determines that the SUB-2 component is idle, at 834 the UE may change any outgoing calls from SUB-2 or incoming calls from SUB-2 to SUB-1. For example, the sidelink priority component 518 in FIG. 5 may change outgoing calls from the SUB-2 component 514 to use the SUB-1 component 512 instead. Additionally, or alternatively, the sidelink priority component 518 in FIG. 5 may change incoming calls to the SUB-2 component 514 to use the SUB-1 component 512 instead. Further, 804 may be performed by the sidelink priority component 940 in FIG. 9.

At 835, the UE may determine the SUB-1 state—whether or not SUB-1 is currently active or in a call. For example, the sidelink priority component 518 in FIG. 5 may determine whether the SUB-1 component 512 is currently active. Further, 804 may be performed by the sidelink priority component 940 in FIG. 9.

If the UE determines that the SUB-1 component is active, at 836 the UE may place SUB-1 on hold, or may merge both calls into a conference call. For example, the sidelink priority component 518 in FIG. 5 may place the call using the SUB-1 component 512 on hold, or may merge both calls using the SUB-1 component 512 and the call incoming or outgoing using the SUB-2 component 514 into a single conference call using the SUB-1 component 512. Further, 804 may be performed by the sidelink priority component 940 in FIG. 9.

If the UE determines that the SUB-1 component is not active, at 838 the UE may transfer the call from SUB-2 to SUB-1. For example, the sidelink priority component 518 in FIG. 5 may ensure that the incoming call is directly received using the SUB-1 component 512, or may ensure that the outgoing call is directly made using the SUB-1 component 512. Further, 804 may be performed by the sidelink priority component 940 in FIG. 9.

Figure 9:
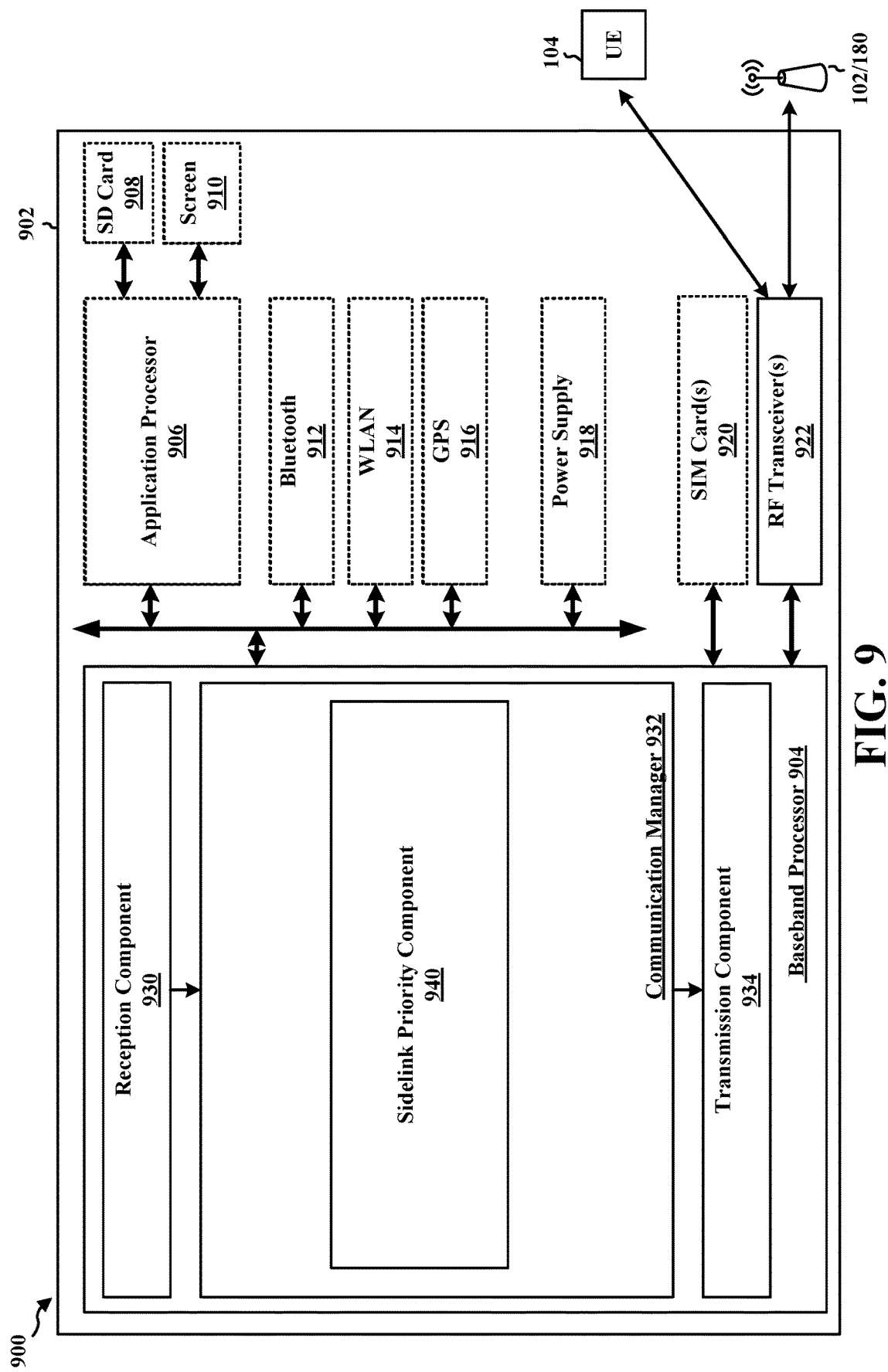
FIG. 9 is a diagram illustrating an example of a hardware implementation for an example apparatus, in accordance with various aspects of the present disclosure.

FIG. 9 is a diagram 900 illustrating an example of a hardware implementation for an apparatus 902. The apparatus 902 may be a UE, or another device configured to transmit and/or receive sidelink communication. The apparatus 902 includes a baseband processor 904 (also referred to as a modem) coupled to a RF transceiver 922. In some aspects, the baseband processor 904 may be a cellular baseband processor and/or the RF transceiver 922 may be a cellular RF transceiver. The apparatus 902 may further include one or more SIM cards 920, an application processor 906 coupled to a secure digital (SD) card 908 and a screen 910, a Bluetooth module 912, a wireless local area network (WLAN) module 914, a GPS module 916, and/or a power supply 918. The baseband processor 904 communicates through the RF transceiver 922 with the UE 104 and/or BS 102/180. The baseband processor 904 may include a computer-readable medium/memory. The computer-readable medium/memory may be non-transitory. The baseband processor 904 is responsible for general processing, including the execution of software stored on the computer-readable medium/memory. The software, when executed by the baseband processor 904, causes the baseband processor 904 to perform the various functions described in the present application. The computer-readable medium/memory may also be used for storing data that is manipulated by the baseband processor 904 when executing software. The baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband processor 904. The baseband processor 904 may be a component of the device 350 and may include the memory 360 and/or at least one of the Tx processor 368, the Rx processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the additional modules of the apparatus 902.

The communication manager 932 includes a component 940 that is configured to maintain a second subscription in an idle mode based on a speed state of the apparatus 902, e.g., as described in connection with step 704 of FIG. 7.

The apparatus may include additional components that perform each of the blocks of the algorithm in the flowcharts of FIGS. 7 and 8. As such, each block in the flowcharts of FIGS. 7 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband processor 904, includes means for communicating in a DSDA mode based on a first subscription and a second subscription; means for maintaining the second subscription in an idle mode based on a speed state of the UE; means for transmitting a sidelink transmission while the second subscription is in the idle mode; means for transmitting the sidelink transmission using multiple antennas in response to the speed state of the UE; means for transmitting the sidelink transmission includes transmitting the sidelink transmission using a CDD transmission scheme based on the speed state of the UE; means for transitioning the second subscription to the idle mode in response to the speed state of the UE meeting a speed state threshold; means for forwarding an incoming call for the second subscription to the first subscription or placing an outgoing call via the first subscription instead of the second subscription; means for placing an ongoing call on the first subscription on hold; means for rejecting a mobile originated voice call on the second subscription based on the speed state of the UE; means for displaying a message based on the speed state of the UE; means for pausing a data transfer on the second subscription to transmit the sidelink transmission using multiple antennas; means for tuning away from communication on the second subscription to transmit one of an initial transmission or a retransmission of the sidelink transmission using multiple antennas; and means for transmitting another of the initial transmission or the retransmission using a single antenna. The means may be one or more of the components of the apparatus 902 configured to perform the functions recited by the means. As described herein, the apparatus 902 may include the Tx Processor 368, the Rx Processor 356, and the controller/processor 359. As such, in one configuration, the means may be the Tx Processor 368, the Rx Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Aspect 1 is an apparatus for wireless communication at a first wireless device including at least one processor coupled to a memory and configured to communicate in a DSDA mode based on a first subscription and a second subscription. The at least one processor may be further configured to maintain the second subscription in an idle mode based on a speed state of the UE. The at least one processor may be further configured to transmit a sidelink transmission while the second subscription is in the idle mode.

Aspect 2 is the apparatus of aspect 1, where to transmit the sidelink transmission may include transmitting the sidelink transmission using multiple antennas in response to the speed state of the UE.

Aspect 3 is the apparatus of aspect 2, where the at least one processor may be further configured to transmit the sidelink transmission includes transmitting the sidelink transmission using a CDD transmission scheme based on the speed state of the UE.

Aspect 4 is the apparatus of any of aspects 1 to 3, where to maintain the second subscription in the idle mode includes transitioning the second subscription to the idle mode in response to the speed state of the UE meeting a speed state threshold.

Aspect 5 is the apparatus of aspect 4, where the speed state is based on a speed of the UE.

Aspect 6 is the apparatus of aspect 4, where wherein the speed state is based on a doppler level for the UE.

Aspect 7 is the apparatus of any of aspects 1 to 6, where to maintain the second subscription in the idle mode includes forwarding an incoming call for the second subscription to the first subscription or placing an outgoing call via the first subscription instead of the second subscription.

Aspect 8 is the apparatus of aspect 7, where to maintain the second subscription in the idle mode further includes placing an ongoing call on the first subscription on hold and forwarding an ongoing call via the second subscription to the first subscription.

Aspect 9 is the apparatus of aspect 7, where the least one processor may be further configured to maintain the second subscription in an active mode if the speed state of the UE comprises a low-speed state. The at least one processor may be further configured to automatically forward an ongoing call via the second subscription to the first subscription if the speed state of the UE changes from a low-speed state to a high-speed state.

Aspect 10 is the apparatus of any of claims 1 to 9, where to maintain the second subscription in the idle mode may include forwarding an incoming call for the second subscription to a third subscription configured by a user of the UE.

Aspect 11 is the apparatus of any of aspects 1 to 10, where to maintain the second subscription in the idle mode further may include rejecting a mobile originated voice call on the second subscription based on the speed state of the UE. Additionally, to maintain the second subscription in the idle mode further may include displaying a message based on the speed state of the UE.

Aspect 12 is the apparatus of any of aspects 1 to 11, where to maintain the second subscription in the idle mode further includes pausing a data transfer on the second subscription to transmit the sidelink transmission using multiple antennas.

Aspect 13 is the apparatus of any of aspects 1 to 12, where to maintain the second subscription in the idle mode further includes tuning away from communication on the second subscription to transmit one of an initial transmission or a retransmission of the sidelink transmission using multiple antennas.

Aspect 14 is the apparatus of aspect 13, where the at least one processor is further configured to transmit another of the initial transmission or the retransmission using a single antenna Aspect 15 is the apparatus of any of aspects 1 to 14, further including a transmitter, where the sidelink transmission may include a V2X message.

Aspect 16 is a method of wireless communication for implementing any of aspects 1 to 15.

Aspect 17 is an apparatus for wireless communication including means for implementing any of aspects 1 to 15.

Aspect 18 is a computer-readable medium storing computer executable code, where the code when executed by a processor causes the processor to implement any of aspects 1 to 15.

What is claimed is:

1. An apparatus for wireless communication at a user equipment (UE), comprising:
    at least one memory; and
    at least one processor coupled to the at least one memory and configured to:
        communicate with at least one wireless device via a first antenna based on a first subscription and via a second antenna based on a second subscription;
        maintain the second subscription in an idle mode based on a speed state of the UE; and
        transmit a sidelink transmission via the second antenna and a third antenna while the second subscription is in the idle mode.

2. The apparatus of claim 1, wherein the at least one processor is further configured to:
    determine whether the speed state of the UE comprises a high-speed state, wherein, to maintain the second subscription in the idle mode based on the speed state of the UE, the at least one processor is configured to:

maintain the second subscription in the idle mode based on the determination that the speed state of the UE comprises the high-speed state.

3. The apparatus of claim 1, wherein, to transmit the sidelink transmission via the second antenna and the third antenna, the at least one processor is further configured to:
transmit the sidelink transmission via the second antenna and the third antenna using a cyclic delay diversity (CDD) transmission scheme based on the speed state of the UE.

4. The apparatus of claim 1, wherein the at least one processor is further configured to:
transition the second subscription to an active mode in response to the speed state of the UE comprising a low-speed state; and
transmit a second sidelink transmission via the third antenna and not via the second antenna while the second subscription is in the active mode.

5. The apparatus of claim 1, wherein the speed state is based on a speed of the UE.

6. The apparatus of claim 1, wherein the speed state is based on a doppler level for the UE.

7. The apparatus of claim 1, wherein, to maintain the second subscription in the idle mode, the at least one processor is configured to:
forward an incoming call for the second subscription to the first subscription or place an outgoing call via the first subscription instead of the second subscription.

8. The apparatus of claim 7, wherein, to maintain the second subscription in the idle mode, the at least one processor is further configured to:
place a first ongoing call on the first subscription on hold; and
forward a second ongoing call via the second subscription to the first subscription.

9. The apparatus of claim 7, wherein the at least one processor is further configured to:
maintain the second subscription in an active mode in response to the speed state of the UE comprising a low-speed state; and
automatically forward an ongoing call via the second subscription to the first subscription in response to the speed state of the UE changing from the low-speed state to a high-speed state.

10. The apparatus of claim 1, wherein, to maintain the second subscription in the idle mode, the at least one processor is configured to:
forward an incoming call for the second subscription to a third subscription configured by a user of the UE.

11. The apparatus of claim 1, wherein, to maintain the second subscription in the idle mode, the at least one processor is configured to:
reject a mobile originated voice call on the second subscription based on the speed state of the UE; and
display a message based on the speed state of the UE.

12. The apparatus of claim 1, wherein, to maintain the second subscription in the idle mode, the at least one processor is configured to:
pause a data transfer on the second subscription to transmit the sidelink transmission using multiple antennas.

13. The apparatus of claim 1, wherein, to maintain the second subscription in the idle mode, the at least one processor is configured to:
tune away from communication on the second subscription to transmit one of an initial transmission or a retransmission of the sidelink transmission using multiple antennas.

14. The apparatus of claim 13, wherein the at least one processor is further configured to:
transmit another of the initial transmission or the retransmission using a single antenna.

15. The apparatus of claim 1, further comprising a transmitter, wherein, to transmit the sidelink transmission, the at least one processor is configured to:
transmit, via the transmitter, a vehicle to everything (V2X) message comprising the sidelink transmission.

16. A method of wireless communication at a user equipment (UE), comprising:
communicating with at least one wireless device via a first antenna based on a first subscription and via a second antenna based on a second subscription;
maintaining the second subscription in an idle mode based on a speed state of the UE; and
transmitting a sidelink transmission via the second antenna and a third antenna while the second subscription is in the idle mode.

17. The method of claim 16, further comprising:
determining whether the speed state of the UE comprises a high-speed state, wherein maintaining the second subscription in the idle mode based on the speed state of the UE, comprises:
maintaining the second subscription in the idle mode based on the determination that the speed state of the UE comprises the high-speed state.

18. The method of claim 16, wherein transmitting the sidelink transmission via the second antenna and the third antenna comprises:
transmitting the sidelink transmission via the second antenna and the third antenna using a cyclic delay diversity (CDD) transmission scheme based on the speed state of the UE.

19. The method of claim 16, further comprising:
transitioning the second subscription to an active mode in response to the speed state of the UE comprising a low-speed state; and
transmitting a second sidelink transmission via the third antenna and not via the second antenna while the second subscription is in the active mode.

20. The method of claim 16, wherein the speed state is based on a speed of the UE.

21. The method of claim 16, wherein the speed state is based on a doppler level for the UE.

22. The method of claim 16, wherein maintaining the second subscription in the idle mode comprises:
forwarding an incoming call for the second subscription to the first subscription or placing an outgoing call via the first subscription instead of the second subscription.

23. The method of claim 22, wherein maintaining the second subscription in the idle mode comprises:
placing a first ongoing call on the first subscription on hold; and
forwarding a second ongoing call via the second subscription to the first subscription.

24. The method of claim 16, wherein maintaining the second subscription in the idle mode comprises:
rejecting a mobile originated voice call on the second subscription based on the speed state of the UE; and
displaying a message based on the speed state of the UE.

25. The method of claim 16, wherein maintaining the second subscription in the idle mode comprises:
pausing a data transfer on the second subscription to transmit the sidelink transmission using multiple antennas.

26. The method of claim 16, wherein maintaining the second subscription in the idle mode comprises:
tuning away from communication on the second subscription to transmit one of an initial transmission or a retransmission of the sidelink transmission using multiple antennas.

27. The method of claim 26, further comprising:
transmitting another of the initial transmission or the retransmission using a single antenna.

28. The method of claim 16, wherein the sidelink transmission comprises a vehicle to everything (V2X) message.

29. A non-transitory computer-readable medium storing computer executable code at a user equipment (UE), the code, when executed by a processor, causing the processor to:
communicate with at least one wireless device via a first antenna based on a first subscription and via a second antenna based on a second subscription;
maintain the second subscription in an idle mode based on a speed state of the UE; and
transmit a sidelink transmission via the second antenna and a third antenna while the second subscription is in the idle mode.

30. An apparatus for wireless communication at a user equipment (UE), comprising:
means for communicating with at least one wireless device via a first antenna based on a first subscription and via a second antenna based on a second subscription;
means for maintaining the second subscription in an idle mode based on a speed state of the UE; and
means for transmitting a sidelink transmission via the second antenna and a third antenna while the second subscription is in the idle mode.

* * * * *